United States Patent
Rowley (10) Patent No.: US 10,942,657 B2
(45) Date of Patent: Mar. 9, 2021

(54) POWER MANAGEMENT INTEGRATED CIRCUIT (PMIC) MASTER/SLAVE FUNCTIONALITY

(71) Applicant: Micron Technology, Inc., Boise, ID (US)

(72) Inventor: Matthew David Rowley, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 266 days.

(21) Appl. No.: 15/919,102

(22) Filed: Mar. 12, 2018

(65) Prior Publication Data

US 2019/0278496 A1    Sep. 12, 2019

(51) Int. Cl.
G06F 1/32 (2019.01)
G06F 3/06 (2006.01)
G06F 1/3246 (2019.01)
G06F 1/3225 (2019.01)
G06F 11/34 (2006.01)

(52) U.S. Cl.
CPC .......... *G06F 3/0625* (2013.01); *G06F 1/3225* (2013.01); *G06F 1/3246* (2013.01); *G06F 11/349* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | | |
|---|---|---|---|---|
| 2010/0250974 A1* | 9/2010 | Ristic | ............... | G06F 1/3203 713/300 |
| 2011/0022859 A1* | 1/2011 | More | ............... | G06F 1/3203 713/300 |
| 2012/0102338 A1* | 4/2012 | Sultenfuss | ............... | G06F 1/26 713/300 |
| 2015/0198987 A1* | 7/2015 | Park | ............... | G06F 1/26 713/300 |
| 2016/0154449 A1* | 6/2016 | Lim | ............... | G06F 1/324 713/322 |
| 2017/0077738 A1* | 3/2017 | Park | ............... | H02J 7/025 |

* cited by examiner

*Primary Examiner* — Zahid Choudhury
(74) *Attorney, Agent, or Firm* — Greenberg Traurig (57) ABSTRACT

A power management integrated circuit (PMIC) capable of operating, in memory systems, as a master control in power management in some situations and operating as a slave control in power management in other situations. For example, when used in a memory system operating on a SATA bus, the PMIC assumes the master control by monitoring the bus signals for entering or existing a sleep mode or a power shutdown mode, communicating to the controller of the memory system to prepare for the respective mode, and when ready, adjusting power states for the mode changes. For example, when used in a memory system operating on a PCIe bus, the PMIC assumes the slave control during a normal mode and a sleep mode, but the master control when the memory system is in a power disable mode in which the controller of the memory system is powered off.

16 Claims, 3 Drawing Sheets

POWER MANAGEMENT INTEGRATED CIRCUIT (PMIC) MASTER/SLAVE FUNCTIONALITY

FIELD OF THE TECHNOLOGY

At least some embodiments disclosed herein relate to power management integrated circuit (PMIC) in general, and more particularly, but not limited to PMIC master/slave functionality.

BACKGROUND

A memory system can be a storage system, such as a solid-state drive (SSD), and can include one or more memory components that store data. For example, a memory system can include memory devices such as non-volatile memory devices and volatile memory devices. In general, a host system can utilize a memory system to store data at the memory devices of the memory system and to retrieve data stored at the memory system.

A Power Management Integrated Circuit (PMIC) can be used to manage the power requirements of a memory system in which the PMIC is configured. The PMIC typically includes electronic power conversion circuitry and/or relevant power control functions. The PMIC manages the power supply to the other components of the memory system, such as the controller, dynamic random-access memory (DRAM), and non-volatile memory of the memory.

BRIEF DESCRIPTION OF THE DRAWINGS

The embodiments are illustrated by way of example and not limitation in the figures of the accompanying drawings in which like references indicate similar elements.

DETAILED DESCRIPTION

Aspects of the present disclosure are directed to a Power Management Integrated Circuit (PMIC) capable of managing the different power mode requirements of memory systems configured on buses of different types. An example of a memory system is a storage system, such as a solid-state drive (SSD). In some embodiments, the memory system is a hybrid memory/storage system. In general, a host system can utilize a memory system that includes one or more memory devices. The memory devices can include non-volatile memory devices, such as, for example, negative-and (NAND). The host system can provide write requests to store data at the memory devices of the memory system and can provide read requests to retrieve data stored at the memory system. A memory system can include a controller that manages the memory devices to perform operations such as reading data, writing data, or erasing data and other such operations. A storage system is used as one example of the memory system hereinafter throughout this document.

Traditional storage systems generally include a conventional power management subsystem that is designed for a specific bus type and designed to have dedicated functionalities for such respective bus type. For example, there are traditional storage systems for a SATA bus that have a conventional power management subsystem that is designed and dedicated to be the "master" in the power management of the storage system for the SATA bus. In another example, there are traditional storage systems for a PCIe bus where the controller is designed to be the "master" in the power management of the storage system during the normal mode of operations and/or during the sleep mode. In PCIe storage systems, the conventional power management subsystem is designed to be a "slave" to the master when the memory system is in normal mode or the sleep mode.

Conventional power management subsystems have different and separate board designs to support different bus types. Conventional power management subsystems typically function statically as a master or a slave. Aspects of the present disclosure address the above and other deficiencies by utilizing a PMIC that is capable of comprehending signals relevant to both master and slave modes of operations on various buses (e.g., PCIe buses and on SATA buses). The PMIC of the present disclosure is a single board design that can be used to operate in multiple types of storage systems. For example, the PMIC of the present disclose can operate in a PCIe storage system and can be used in a SATA storage system. Consolidating the power management functionality into the presently disclosed PMIC saves power and board area, in comparison with managing power requirements using a general purpose mixed-signal micro-controller. The presently disclosed PMIC allows storage systems adapted for connection to various buses (e.g., PCIe buses and SATA buses) to have different operational characteristics in sleep versus normal/active modes.

When entering a sleep mode, some storage systems (e.g., a SATA storage system) can turn off power supplies to the controller of the storage system, while other types of storage systems (e.g., a PCIe storage system) can have a controller that has an "always on domain". An "always on domain" hereinafter refers to a portion of a controller that remains powered.

When the PMIC is in a master mode, the PMIC monitors relevant signals on a bus, which may be a PCIe bus or a SATA bus (or another bus), and communicates (e.g., via a 2-pin communication scheme) with a respective controller to notify the controller of the mode change, such as a change from a normal mode to a low power mode or a change from the low power mode to the normal mode. To enter the low power mode, the PMIC communicates with the controller to prepare for the low power mode. After completing appropriate preparation for the low power mode, the respective controller acknowledges to the PMIC the readiness to enter the low power mode, which causes the PMIC to shut down the appropriate power rails/lines to enter the low power mode.

When the PMIC is in a slave mode, the controller monitors the relevant power management signals on a bus, which may be a PCIe bus or a SATA bus (or another bus), performs operations to prepare the storage device for a low power mode, and when the storage device is ready to enter the low power mode, communicates (e.g., via the 2-pin communication scheme) with the PMIC to instruct the PMIC to effectuate the power changes for the low power mode.

When the PMIC is in a slave mode and the storage device is in a sleep mode, the controller uses its "always on domain" to continue monitoring the host bus for a wake signal and notifies the PMIC when it's time to re-enter the normal/active mode where the storage device is sufficiently powered to store data in a non-volatile memory and/or retrieve data from the non-volatile memory.

Further, the presently disclosed PMIC allows the real time switching of master power management roles, allowing storage devices (e.g., used in data centers) to transfer master mode control role from the controller to the PMIC to support device power off states and transfer master mode control role from the PMIC back to the controller to support device restarting from power off states (e.g., on PCIe buses).

Figure 1:
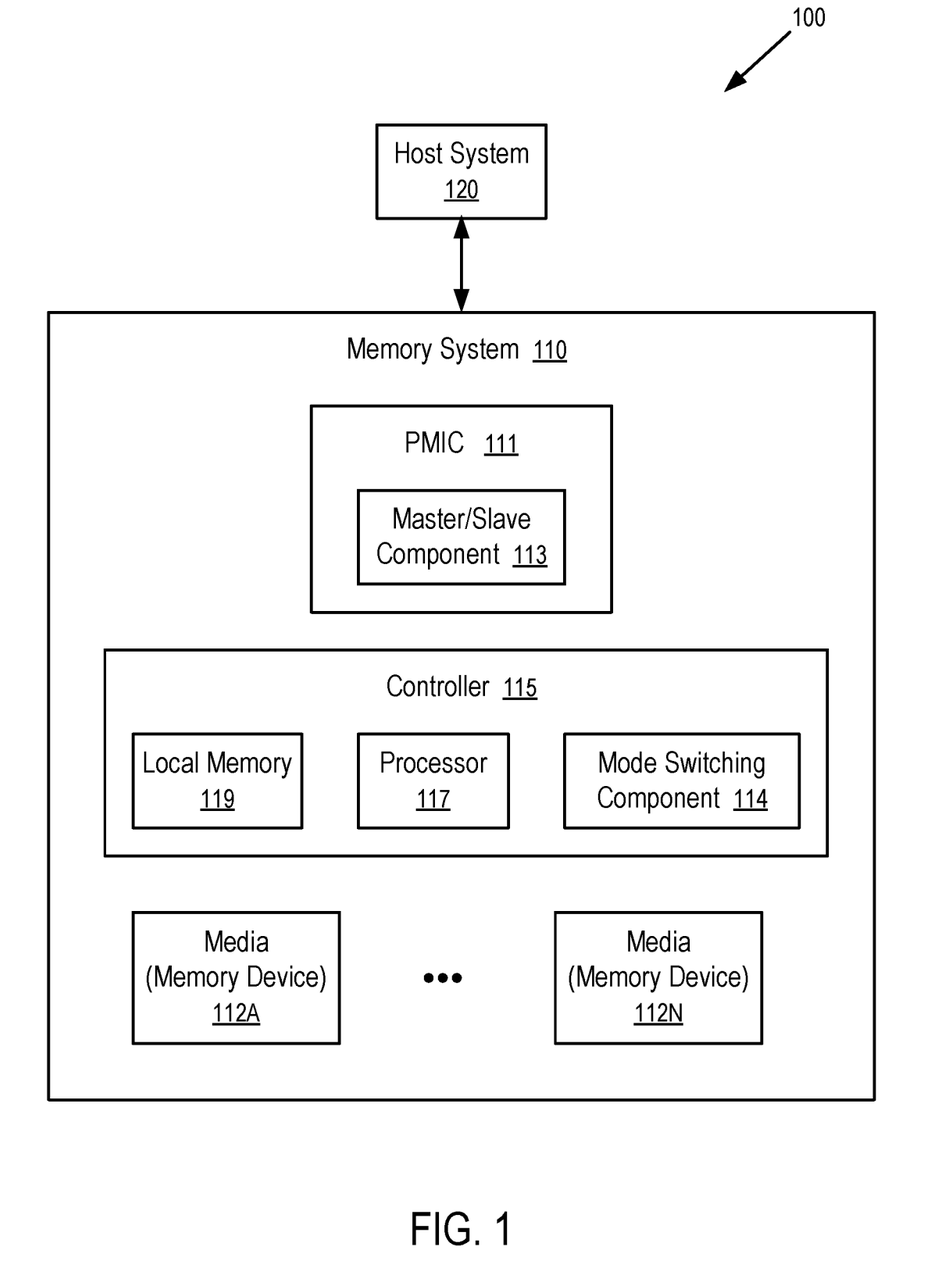
FIG. 1 shows a computer system having a power management integrated circuit (PMIC) configured to manage power requirements of a memory system, in accordance with some embodiments of the present disclosure.

FIG. 1 illustrates an example computing environment 100 that includes a memory system 110 in accordance with some implementations of the present disclosure. The memory system 110 can include media, such as memory devices 112A to 112N. The memory devices 112A to 112N can be volatile memory devices, non-volatile memory devices, or a combination of such. In some embodiments, the memory system is a storage system. An example of a storage system is a SSD. In some embodiments, the memory system 110 is a hybrid memory/storage system. In general, the computing environment 100 can include a host system 120 that uses the memory system 110. In some implementations, the host system 120 can write data to the memory system 110 and read data from the memory system 110.

The host system 120 can be a computing device such as a desktop computer, laptop computer, network server, mobile device, or such computing device that includes a memory and a processing device. The host system 120 can include or be coupled to the memory system 110 so that the host system 120 can read data from or write data to the memory system 110. The host system 120 can be coupled to the memory system 110 via a physical host interface. As used herein, "coupled to" generally refers to a connection between components, which can be an indirect communicative connection or direct communicative connection (e.g., without intervening components), whether wired or wireless, including connections such as, electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory system 110. The host system 120 can further utilize an NVM Express (NVMe) interface to access the memory devices 112A to 112N when the memory system 110 is coupled with the host system 120 by the PCIe interface. The physical host interface can provide an interface for passing control, address, data, and other signals between the memory system 110 and the host system 120.

The memory devices 112A to 112N can include any combination of the different types of non-volatile memory devices and/or volatile memory devices. An example of non-volatile memory devices includes a negative-and (NAND) type flash memory. Each of the memory devices 112A to 112N can include one or more arrays of memory cells such as single level cells (SLCs) or multi-level cells (MLCs) (e.g., triple level cells (TLCs) or quad-level cells (QLCs)). In some implementations, a particular memory device can include both an SLC portion and a MLC portion of memory cells. Each of the memory cells can store bits of data (e.g., data blocks) used by the host system 120. Although non-volatile memory devices such as NAND type flash memory are described, the memory devices 112A to 112N can be based on any other type of memory such as a volatile memory. In some implementations, the memory devices 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many Flash-based memory, cross point non-volatile memory can perform a write in-place operation, where a non-volatile memory cell can be programmed without the non-volatile memory cell being previously erased. Furthermore, the memory cells of the memory devices 112A to 112N can be grouped as memory pages or data blocks that can refer to a unit of the memory device used to store data.

The controller 115 can communicate with the memory devices 112A to 112N to perform operations such as reading data, writing data, or erasing data at the memory devices 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory system 110, including handling communications between the memory system 110 and the host system 120, and the functions of the mode switching component 114, which is described in greater detail below. In some embodiments, the local memory 119 can include memory registers storing, e.g., memory pointers, fetched data, etc. The local memory 119 can also include read-only memory (ROM) for storing micro-code. While the example memory system 110 in FIG. 1 has been illustrated as including the controller 115, in another embodiment of the present disclosure, a memory system 110 may not include a controller 115, and may instead rely upon external control (e.g., provided by an external host, or by a processor or controller separate from the memory system).

In general, the controller 115 can receive commands or operations from the host system 120 and can convert the commands or operations into instructions or appropriate commands to achieve the desired access to the memory devices 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory devices 112A to 112N. The controller 115 can further include host interface circuitry to communicate with the host system 120 via the physical host interface. The host interface circuitry can convert the commands received from the host system into command instructions to access the memory devices 112A to 112N as well as convert responses associated with the memory devices 112A to 112N into information for the host system 120.

The memory system 110 can also include additional circuitry or components that are not illustrated. In some implementations, the memory system 110 can include a cache or buffer (e.g., DRAM) and address circuitry (e.g., a row decoder and a column decoder) that can receive an address from the controller 115 and decode the address to access the memory devices 112A to 112N.

The host system 120 has one or more connectors to provide the memory system 110 with power and/or communicate with the memory system 110 via a communication channel via a predetermined protocol; and the memory system 110 has one or more connectors to receive the power, data and commands from the host system 120. For example, the connection between connector on the host system 120 and connector on memory system 110 may utilize either a PCIe bus or a SATA bus.

In one example, when the memory system 110 is coupled to a SATA bus, the memory system 110 has a "power shutdown" mode where the memory system 110 is shut off completely with the exception of a minimal amount of circuitry needed to wake the memory system when the host system provides an enable signal to the memory system.

In one example, when the memory system 110 is coupled to a PCIe bus, the memory system 110 can adopt a similar function (e.g., for use in data centers), where the memory system 110 is also shut down almost completely. When a PCIe memory system 110 is in such a "power disable" mode, the power management subsystem assumes the "master" control and monitors the PCIe bus for a wake signal.

The memory system 110 includes a power management integrated circuit (PMIC) 111 configured to manage power requirements of a memory system, in accordance with some implementations of the present disclosure.

The PMIC 111 has different power management modes of operation that allow the PMIC 111 to be used in memory systems 110 for various bus types. The power management modes include a master mode and a slave mode. The PMIC 111 can be placed in a master mode or a slave mode depending on the type of bus used and/or the operating condition of the memory system 110 in which the PMIC 111 is used. When in master mode, the PMIC 111 monitors the power management signals, and makes power mode change decisions in view of the detected power management signals. For example, when the memory system 110 utilizes a SATA bus, the PMIC 111 operates in a master mode to monitor power management signals on the SATA bus. When the SATA memory system enters a low power mode, such as a sleep mode or a power shutdown mode, the PMIC 111, as master, instructs the controller 115 to prepare for entering the low power mode.

When the PMIC 111 is in the slave mode, the controller 115 makes power mode change decisions as a power management master. The PMIC 111 and the controller 115 generally communicate with each other to prepare changes for the memory system 110 to switch operating from a normal mode to a low power mode (e.g., sleep, power disable, or power shutdown). For example, when the memory system 110 is used as a PCIe storage system, the PMIC 111 operates in a slave mode to effectuate power changes in response to receiving, as a slave, instructions from the controller 115. When the PMIC 111 is used as a slave, for example, when the memory system 110 is coupled to a PCIe bus, the PMIC 111 still provides power to the controller 115 when the memory system 110 is in a sleep mode, such that a portion of the controller 115 is still powered on and serves as the power management master of the PMIC 111 to monitor the bus for the de-assertion of the sleep signal. The PMIC 111 serves as the power management slave of the controller 115 during normal mode and during sleep mode, when the memory system 110 is coupled to a PCIe bus.

The PMIC can switch power management modes, for example, in response to receiving instructions from a mode switching component 114 of the controller 115. For example, the PMIC can switch from slave mode to master mode. For instance, when used in a PCIe memory system, when the controller 115 is powered off, the mode switching component 114 can instruct the PMIC 111 to switch from slave mode to master mode to monitor power management signals on the PCIe bus for re-entering the normal/active mode.

Buses (e.g., PCIe and SATA buses) have different shutdown or power disable/shutdown signals. The PMIC 111 has one or more pins to receive power management signals on different types of buses. The one or more pins can be dedicated pins or multi-use pins. The pins can be configured, for example at the time of manufacturing the memory system, to be enable for a master mode or a slave mode. The master mode can support for a first type of bus (e.g., SATA bus). The slave mode can support a second type of bus (e.g., PCIe bus).

For example, when the PMIC 111 is configured in master mode, the PMIC 111 can include a pin to monitor a SATA bus for a signal which may be asserted on the SATA bus to request the memory system 110 to enter a sleep mode and de-asserted to request the memory system 110 to wake up and enter a normal/active mode. When the PMIC 111 is used in a memory system 110 that is coupled to a SATA bus, the PMIC 111, as master, can turn off the power supply to the controller 115 to enter the sleep mode.

In another example when the PMIC 111 is configured in master mode, the PMIC 111 can include a pin to monitor a SATA bus for a signal which may be asserted on the SATA bus to request the memory system 110 to enter a power shutdown/disable mode and de-asserted to request the memory system 110 to restart and enter the normal/active mode.

In an example when the PMIC 111 is configured in slave mode, the controller 115 is responsible for monitoring the sleep/wake signal on the PCI bus which may be asserted to request the memory system 110 to enter a sleep mode, and de-asserted to request the memory system 110 to wake up and enter the normal/active mode. Thus, when the PMIC 111 is in slave mode the pins are not configured to monitor the sleep/wake signals on the PCIe bus.

The PMIC 111 is capable of switching between a slave mode in power management and a master mode in power management. For example, when the memory system 110 is coupled to a PCIe bus and operating in a normal mode or a sleep mode, the PMIC 111 operates in a slave mode and allows the controller 115 to be the master of the PMIC 111 in power management. The controller 115 monitors the sleep/wake signals. However, when the host system 120 asserts the signal for the power disable mode, the PMIC 111 receives an instruction from the controller 115 to switch from slave mode to master mode for power management while the controller 115 is turned off completely for the power disable mode.

Figure 2:
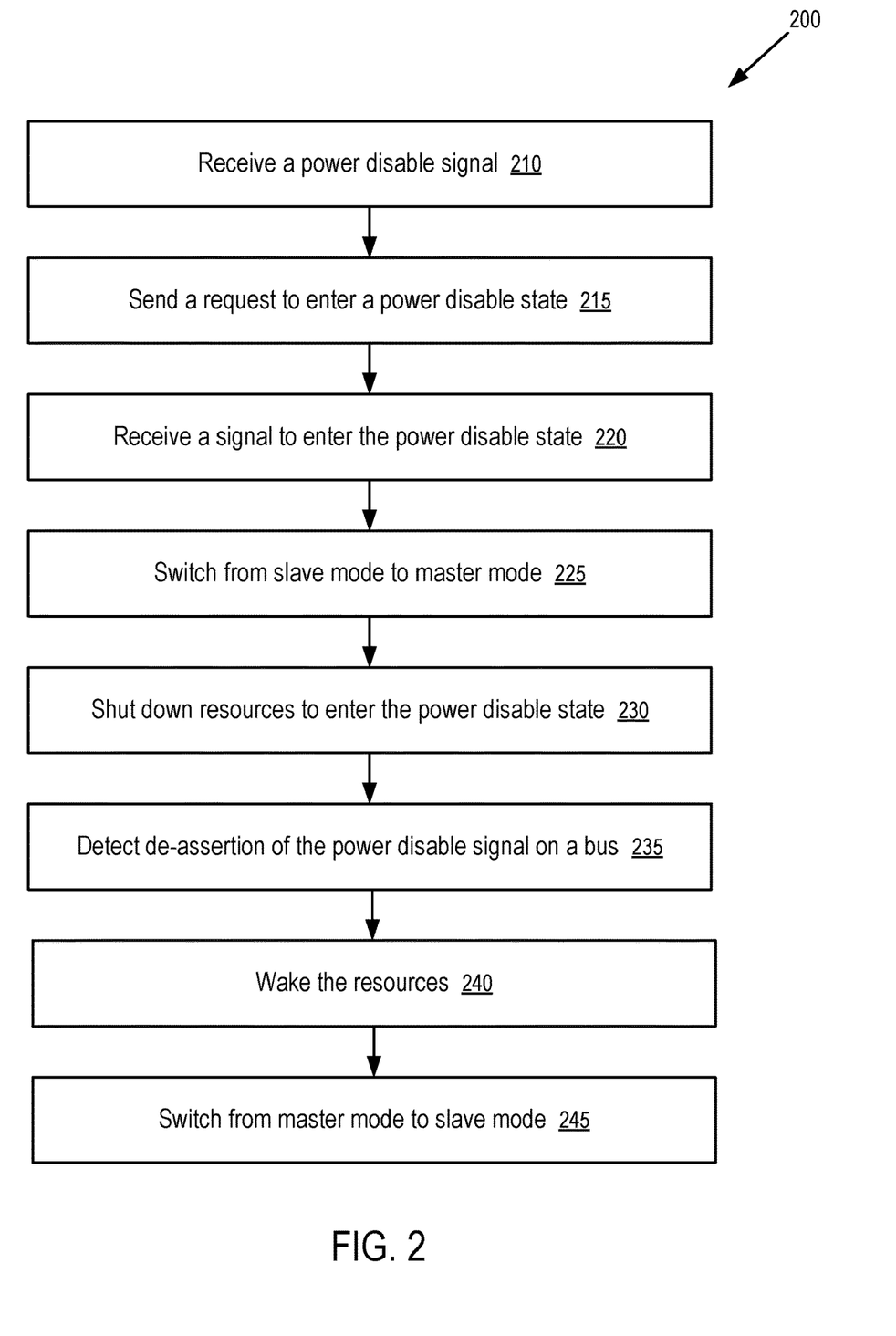
FIG. 2 is a method of the PMIC to manage changes to or from a power disable mode, in accordance with some embodiments of the present disclosure.

FIG. 2 is a flow diagram of an example method 200 for switching modes in a PMIC in accordance with some implementations of the present disclosure. Method 200 can be performed by processing logic that can include hardware (e.g., circuitry, dedicated logic, programmable logic, microcode, etc.), software (such as instructions run on a processing device), firmware, or a combination thereof. In one embodiment, the master/slave component 113 of a processing device of a PMIC (e.g., PMIC 111) in FIG. 1 can perform method 200. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various embodiments. Thus, not all processes are required in every implementation. Other process flows are possible.

At block 210, the processing device receives a power disable signal. The power disable signal can be received a host system. The PMIC can include a set of pins to receive power management signals. The set of pins are configurable to receive power management signals of a first type of bus or a second type of bus. The PMIC effectuates one or more power modes on the first type of bus in response to configuring the set of pins for the first type of bus, and one or more power modes on the second type of bus in response to configuring the set of pins for the second type of bus.

When the set of pins are configured to receive power management signals from a bus of the first type, the PMIC is a master for power management and configured to receive, via the set of pins, a sleep signal or a power disable signal of the bus of the first type.

At block 215, processing device sends a request to enter a power disable state/mode. The request can be sent to a controller. In response to receiving a sleep signal or a power disable signal, the processing device can instruct a controller of a memory system to enter a power mode requested by the sleep signal or the power disable signal.

At block 220, processing device receives a signal to enter the power disable state/mode. The signal can be received from a mode switching component (e.g., mode switching component 114 in FIG. 1) of the controller.

At block 225, processing device switches from slave mode to master mode. At block 230, processing device shuts down power resources to enter the power disable. The processing device can cause adjustment of voltages in accordance with the power mode.

In some embodiments, when the master mode is transferred to the PMIC 111, a load switch may be turned off to isolate the controller from the power, as described in greater detail below) in conjunction with FIG. 3.

In some embodiments, method 200 further includes the processing device detects de-assertion of the power disable signal at block 235. The signal can be detected on the host bus (e.g., PCIe bus. The processing device can detect, in the set of pins, de-assertion of a sleep signal or a power disable signal.

At block 240, processing device wakes (or restarts) the power resources once the de-assertion of the power disable signal is detected. In some embodiments, the processing device, in response to the wake request, adjusts voltages to a normal mode in accordance with the wake request. In some embodiments, the processing device restarts the memory system. For example, a voltage regulator for the controller can be turned on to produce the required voltage for the controller. In another example, a load switch can be turned on via a switch driver to connect the power to the controller at the required voltage for the controller.

In some embodiments, method 200 further includes the processing device changes from master mode to slave mode at block 245. The processing device can cause the controller to resume the master mode. sending a signal indicating that power is operational after waking the power resources. The processing device can send a signal to the controller to trigger the controller to act as master.

Figure 3:
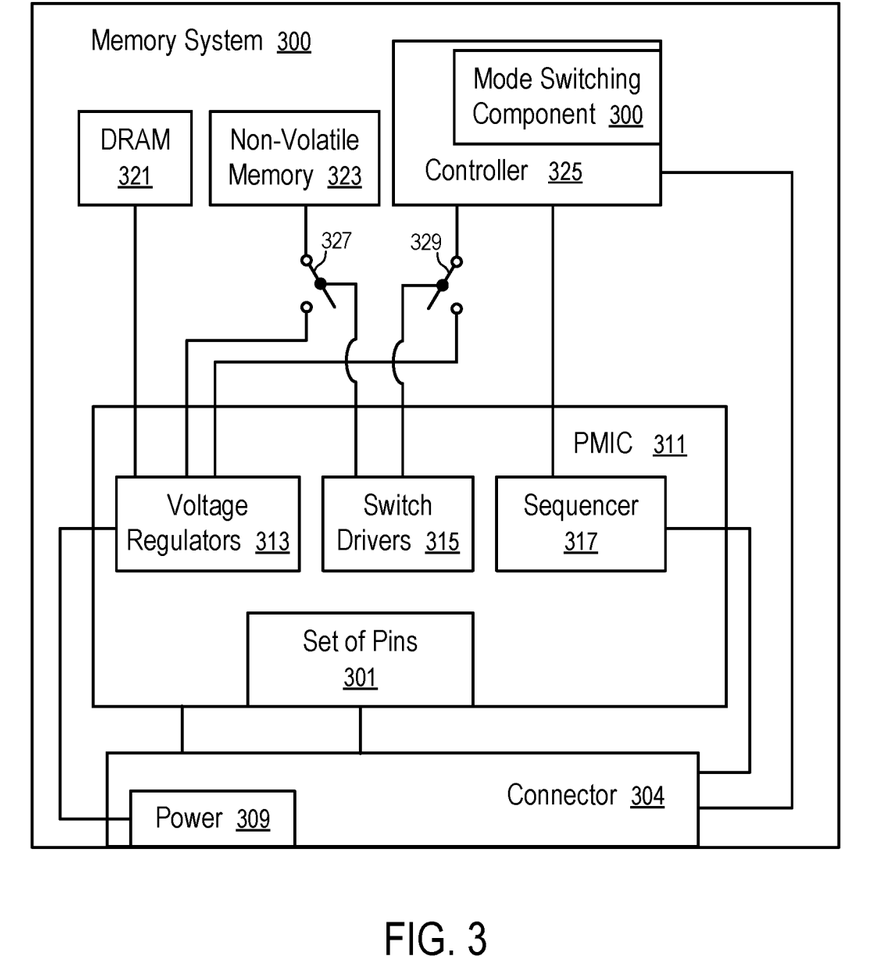
FIG. 3 illustrates a memory system, in accordance with some implementations of the present disclosure.

FIG. 3 illustrates a memory system 300, in accordance with some implementations of the present disclosure. The master/slave component 302 of the PMIC 311 can include a sequencer 317 that schedules the power related events according to desirable sequences for the operations of the memory system 300, including the operation sequences of the voltage regulators 313 and the switch drivers 315.

For example, when the PMIC 311 is in master mode and coupled to a SATA bus, in response to the assertion of the sleep signal or a power disable signal being detected in a pin in the set of pins 301 connected to a SATA bus, the sequencer 317 communicates with the controller 325 to request the controller 325 to enter a sleep mode or a power off mode. When the controller 325 acknowledges to the sequencer 317 the readiness to enter the sleep mode or power off mode, the sequencer 317 causes the voltages regulators 313 and/or the switch drivers 315 to turn off certain voltages or power domains in accordance with the sleep mode or the power off mode. When in the sleep mode or the power off mode, the master/slave component 302 of the PMIC 311 further monitors a set pins 301 for the de-assertion of the sleep or power disable signal for waking up or re-entering the normal/active mode. A "set" can include one or more pins. In some embodiments, the same set of pins can be configured to receive power managements signals from different types of buses.

For example, when the PMIC 311 is in slave mode and coupled to a PCIe bus, in response to the assertion of the power disable signal sensed in the one of the pins 301 connected to the PCIe bus, the sequencer 317 communicates with the controller 325 about the power disable signal. When the controller 325 is ready to enter the power disable mode, the mode switching component 351 of the controller 325 communicates to the sequencer 317 to switch the PMIC 311 from a slave mode to a master mode in power management and to cause the voltage regulators 313 and/or the switch drivers 315 to turn off voltages or power domains in accordance with the power disable mode. While the memory system 300 is in the power disable mode, the PMIC 311 functions as a power management master to monitor for the de-assertion of the power disable signal sensed in the pins 301 connected to the PCIe bus; and in response to the de-assertion, the sequencer 317 causes the voltage regulators 313 and/or the switch drivers 315 to power up the memory system 300 for normal operations. Once the memory system 300 exits the power disable mode, the sequencer 317 communicates with the controller 325 such that the controller 325 becomes the power management master of the PMIC 311.

In general, the PMIC 311 has one or more voltage regulators 313 that convert the power 309 to operating voltages used by various components of the memory system 300, such as the controller 325, the non-volatile memory 323, and the DRAM 321. The PMIC 311 manages the power supply to other components of the memory system 300, such as DRAM 321, the non-volatile memory 323, and the controller 325.

The memory system 300 can include one or more load switches (e.g., 327 and 329) for the isolation of power domains. During operational modes the load switches (327 and 329) are turned on to provide power 309 via the voltage regulators 313 to these corresponding components. During certain non-operational modes the load switches (327 and 329) can be turned off to isolate the power 309 from some of the components of the memory system 300, such as the controller 325, the non-volatile memory 323. In some embodiments, the load switches (327, 329) are implemented outside of the PMIC 311. The PMIC 311 includes one or more switch drivers 315 that provide the control signals for the load switches (327, 329).

In some instances, the controller 325 has in-processor cache memory with data access performance that is better than the volatile DRAM 321 and/or the non-volatile storage media 323. Thus, it is preferred to cache parts of instructions and data used in the current computing task in the in-processor cache memory of the controller 325 during the computing operations of the controller 325. In some instances, the controller 325 has multiple processors, each having its own in-processor cache memory.

Optionally, the controller 325 performs data intensive, in-memory processing using data and/or instructions organized in the memory system 300. For example, in response to a request from a host system, the controller 325 performs a real time analysis of a set of data stored in the memory system 300 and communicates a reduced data set to the host system as a response. For example, in some applications, the memory system 300 is connected to real time sensors to store sensor inputs; and the processors of the controller 325 are configured to perform machine learning and/or pattern recognition based on the sensor inputs to support an artificial intelligence (AI) system that is implemented at least in part via the memory system 300 and/or the host system.

In some implementations, the processors of the controller 325 are integrated with memory (e.g., 321 or 323) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate and decreases latency and power usage.

The memory system 300 can be used in various computing systems, such as a cloud computing system, an edge computing system, a fog computing system, and/or a stand-alone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

Some embodiments involving the operation of the controller 325 can be implemented using computer instructions executed by the controller 325, such as the firmware of the controller 325. In some instances, hardware circuits can be used to implement at least some of the functions of the firmware. The firmware can be initially stored in the non-volatile storage media 323, or another non-volatile device, and loaded into the volatile DRAM 321 and/or the in-processor cache memory for execution by the controller 325.

A non-transitory computer storage medium can be used to store instructions of the firmware of the memory system 110. When the instructions are executed by the controller 115 of the computer memory system 110, the instructions cause the controller 115 to perform a method discussed above.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or micro-controller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A power management integrated circuit (PMIC), comprising:
    a set of pins to receive power management signals, wherein the set of pins are configurable to receive power management signals of a first type of bus or a second type of bus;
    wherein the PMIC effectuates one or more power modes on the first type of bus in response to configuring the set of pins for the first type of bus, and one or more power modes on the second type of bus in response to configuring the set of pins for the second type of bus;
    wherein when the set of pins are configured to receive power management signals from a bus of the first type, the PMIC is a master for power management and configured to:
        receive, via the set of pins, a sleep signal or a power disable signal on the bus of the first type; and
        in response to receiving the sleep signal or the power disable signal, instruct a controller of a memory system to enter a power mode requested by the sleep signal or the power disable signal and cause adjustment of a plurality of voltages in accordance with the power mode.

2. The PMIC of claim 1, when the set of pins are configured to receive power management signals from a bus of the second type, the PMIC is a slave for power management and configured to:
    receive a sleep request;
    in response to the sleep request, adjust a plurality of voltages in accordance with the sleep request;
    receive a power disable request, responsive to the power disable signal on the bus of the second type; and
    in response to the power disable request, turn off the power to the controller, and monitor the set of pins for an enable power signal on the bus of the second type; and
    in response to the enable power signal on the bus of the second type, power up the controller.

3. The PMIC of claim 1, wherein the bus of the first type uses a serial advanced technology attachment (SATA) interface.

4. The PMIC of claim 1, wherein the bus of the second type use a peripheral component interconnect express (PCIe) interface.

5. The PMIC of claim 1, wherein when the set of pins is coupled to receive power management signals from the bus of the first type, the PMIC is further configured to:
    detect, in the set of pins, de-assertion of the sleep signal or a power disable signal; and
    restart the memory system.

6. The PMIC of claim 1, wherein when the set of pins is coupled to receive power management signals from the bus of the second type, the PMIC is further configured to:
    receive a wake request; and
    in response to the wake request, adjust a plurality of voltages to a normal mode in accordance with the wake request.

7. The PMIC of claim 1, wherein when set of pins is coupled to receive power management signals from the bus of the second type, the PMIC is further configured to:
    receive, via the set of pins, the power disable signal on the bus of the second type; and
    in response to the power disable signal on the bus of the second type, communicate with the controller to receive the power disable request from the controller.

8. A power management integrated circuit (PMIC), comprising:
    a plurality of voltage regulators to generate a plurality of voltages for a storage device having a controller; and
    a sequencer to control one or more sequences of power events in the PMIC;
    wherein the PMIC functions as a master of the controller in power management under a first condition;
    wherein the PMIC functions as a slave of the controller in power management under a second condition;
    wherein the first condition includes the storage device being in a first power mode; and
        the second condition includes the storage device being in a second power mode.

9. The PMIC of claim 8, wherein the first condition includes the storage device being connected to a host via a first type of buses; and the second condition includes the storage device being connected to a host via a second type of buses.

10. The PMIC of claim 9, wherein buses of the first type are in accordance with a serial advanced technology attachment (SATA) interface; and buses of the second type are in accordance with a peripheral component interconnect express (PCIe) interface.

11. The PMIC of claim 8, wherein the second power mode includes one of: a normal mode and a sleep mode; and the first power mode includes a power disable mode.

12. The PMIC of claim 8, wherein the PMIC changes from being the slave of the controller to the master of the controller in response to assertion of the power disable signal on a bus to which the storage device is attached.

13. The PMIC of claim 12, wherein the PMIC changes from being the master of the controller to the slave of the controller in response to de-assertion of the power disable signal on the bus.

14. A method implemented in a power management integrated circuit (PMIC), comprising:
receiving input indicating whether to configure the PMIC in a master mode or a slave mode;
configuring one or more pins of the PMIC for a first bus type in response to the input indicating to configure the PMIC in a master mode;
configuring one or more pins of the PMIC for a second bus type in response to the input indicating to configure the PMIC a slave mode;
monitoring a pin of the PMIC for assertion of a power disable signal; and
in response to the assertion of the power disable signal:
triggering the functioning as the slave in the memory system to change to functioning as the master in the memory system;
turning off power to a component in the memory system;
monitoring a pin of the PMIC for assertion of a power disable signal; and
in response to the assertion of the power disable signal:
triggering the functioning as the slave in the memory system to change to functioning as the master in the memory system; and
turning off power to a component in the memory system.

15. A method, comprising:
receiving, in a controller as a master of a power management integrated circuit (PMIC) in power management in a memory system, a request from the PMIC to enter a low power mode;
in response to the request, preparing the memory system for the low power mode; and
upon completion of preparing the memory system for the low power mode, transmitting from the controller to the PMIC, a response indicating that the memory system is ready for the low power mode and the controller is ready to become a slave of the PMIC in power management in the memory system, wherein in response to the response, the PMIC adjusts power supply to enter the low power mode and becomes the master of the controller in power management in the memory system.

16. The method of claim 15, further comprising:
receiving, in the controller, an indication that power supply is adjusted to support active operations in the memory system; and
changing the controller from the slave of the PMIC in power management in the memory system to the master of the PMIC in power management in the memory system.

* * * * *